E. F. LEMOINE.
FACING-HAMMER FOR DRESSING MILLSTONES, &c.
No. 184,877. Patented Nov. 28, 1876.
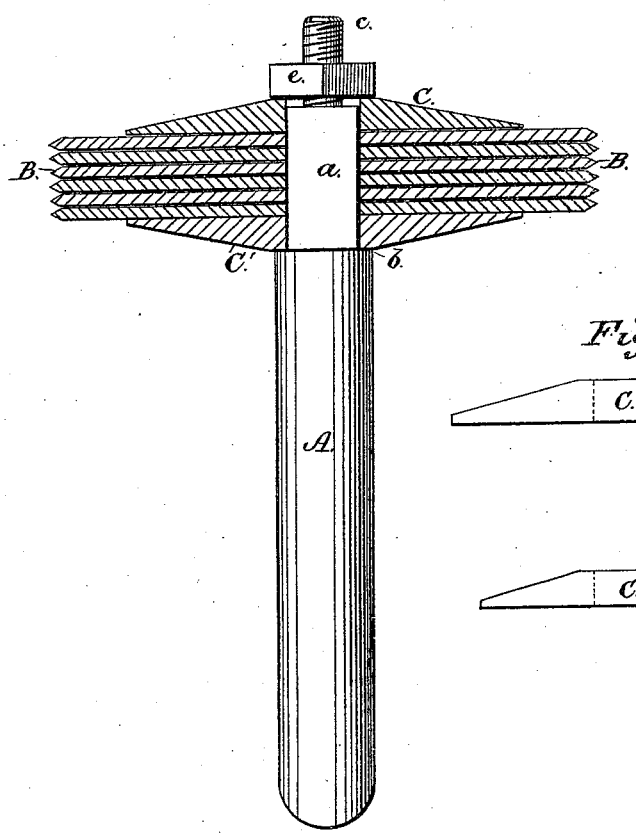

UNITED STATES PATENT OFFICE.

EDGAR F. LEMOINE, OF EMMERTON, VIRGINIA.

IMPROVEMENT IN FACING-HAMMERS FOR DRESSING MILLSTONES, &c.

Specification forming part of Letters Patent No. 184,877, dated November 28, 1876; application filed October 2, 1876.

*To all whom it may concern:*

Be it known that I, EDGAR F. LEMOINE, of Emmerton, in the county of Richmond and State of Virginia, have invented a new and Improved Facing-Hammer; and I do hereby declare that the following is a full, clear, and exact description of the same, reference being had to the accompanying drawing, forming part of this specification, in which—

Figure 1 is a side view, with the head of the pick in section; Fig. 2, a top view of the pick with the screw-nut removed. Fig. 3 is a detail of the clamping-plates.

My invention relates to certain improvements in facing-hammers designed more particularly for dressing millstones, but applicable also for general use in stone-cutting. It consists in the particular construction and arrangement of the tool, in which the handle is constructed with a shoulder and a squared or rectangular stem, screw-threaded at its end, upon which squared portion cutting-blades, with corresponding perforations, are held by double inclined plates, which are clamped between a screw-nut upon the threaded end of the stem and the shoulder of the handle.

In the drawing, A represents the handle, made with a square or rectangular shank, $a$, shoulder $b$, and projecting screw-threaded stem $c$. B represents the cutting-blades of any suitable number, each of which is provided with a square or rectangular perforation, $d$, that fits the shank of the handle. Said blades are arranged parallel and adjacent to each other upon the shank of the handle, and are held between the two clamp-plates C C', the lower one of which abuts against the shoulder $b$ of the handle, and the upper one of which is forced downwardly to tightly secure the blades by means of a screw-nut, $e$, upon the projecting stem of the handle.

The object of the arrangement just described is to prevent the turning of the cutting-blades upon each other, which end is attained in a simple and practical manner through the instrumentality of the squared shank and similar perforations in the blades, together with the clamping devices.

The clamp-plates C C' I propose to make in variable sizes, as shown in Fig. 3, so that, as the blades become shorter from wear, shorter clamp-plates may be substituted, and the life of the cutting-blades thus prolonged.

I am aware that it is not new to perforate the cutting-blades with a square or rectangular hole corresponding to the shank, to prevent the blades from turning, the same being shown in the Patent No. 111,810, in which the blades are secured to the shank by a triple arrangement of keys.

I am also aware that it is not broadly new to employ a screw-nut for bringing together the clamp that holds the blades, this being shown in Patent No. 91,284. I, therefore, lay no broad claim to either of these features, but confine myself to my particular construction shown and described, in which, by combining a screw-nut for clamping and a squared shank to prevent the turning of the blades, I am enabled to dispense with keys entirely; and there being no necessity, therefore, for making the holes in the blades any larger than the dimensions of the squared shank, I am, consequently, enabled to have more metal in the blade at the center, and thus secure a stronger blade. By forming the handle, moreover, with a shoulder, and using the double inclined clamp-plates, the small shoulder upon the handle, by operating through the stiffened plates, is made to form a rigid and unyielding abutment for the blades to be clamped against by the action of the screw-nut.

The objection to the use of keys are, first, that they are liable to jar out from the impact of the blows; secondly, they necessitate a large hole in the blades, and correspondingly weaken the same; and, thirdly, they weaken the shank when employed to clamp the plates, and form but an imperfect abutment for the blades or plates to be clamped against, all of which objections are obviated by my invention.

Having thus described my invention, what I claim as new is—

The handle, having the shoulder $b$, screw-threaded stem $c$, and the intermediate squared or rectangular shank $a$, in combination with the cutting-blades, having a perforation corresponding in size and shape to the said shank, the double-inclined or wedge-shaped clamp-plates C C', and the screw-nut $e$, fitting upon the stem $c$, and adapted to secure the parts rigidly together.

EDGAR F. LEMOINE.

Witnesses:
O. M. LEMOINE,
JNO. S. BRAXTON.